United States Patent
Fletcher, III

[11] 3,855,098
[45] Dec. 17, 1974

[54] ION-RESPONSIVE ELECTRODE CONSTRUCTION

[75] Inventor: Kenneth S. Fletcher, III, Norfolk, Mass.

[73] Assignee: The Foxboro Company, Foxboro, Mass.

[22] Filed: Jan. 24, 1973

[21] Appl. No.: 326,520

Related U.S. Application Data
[63] Continuation of Ser. No. 064,952, Aug. 19, 1970.

[52] U.S. Cl. .................. 204/195 G, 204/195 M
[51] Int. Cl. .................. G01n 27/36, G01n 27/46
[58] Field of Search .......... 204/1 T, 195 G, 195 M

[56] References Cited
UNITED STATES PATENTS
| | | | |
|---|---|---|---|
| 3,458,422 | 7/1969 | Proctor | 204/195 G |
| 3,717,565 | 2/1973 | Doyle | 204/195 G |

FOREIGN PATENTS OR APPLICATIONS
| | | | |
|---|---|---|---|
| 495,303 | 11/1938 | Great Britain | 204/195 G |
| 492,936 | 9/1938 | Great Britain | 204/195 H |

Primary Examiner—T. Tung
Attorney, Agent, or Firm—Bryan, Parmelee, Johnson & Bollinger

[57] ABSTRACT

An ion-sensitive electrode comprising a mass of porous inert material such as ceramic, carrying on one surface thereof a thin ion-sensitive membrane adapted to be exposed to a test liquid to develop an electrical potential as a function of ionic activity or concentration in the test liquid, the porous material providing mechanical support for the membrane, the porosity of the material serving to define continuous channels to carry electrolyte liquid to the interior surface of the membrane.

1 Claim, 5 Drawing Figures

PATENTED DEC 17 1974　　　　　　　　3,855,098
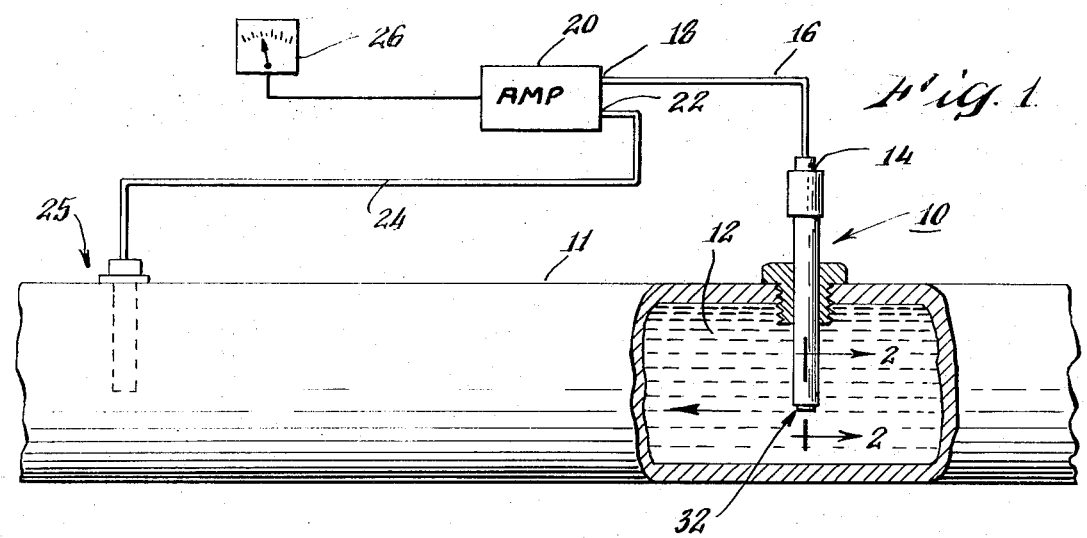
Fig. 1.
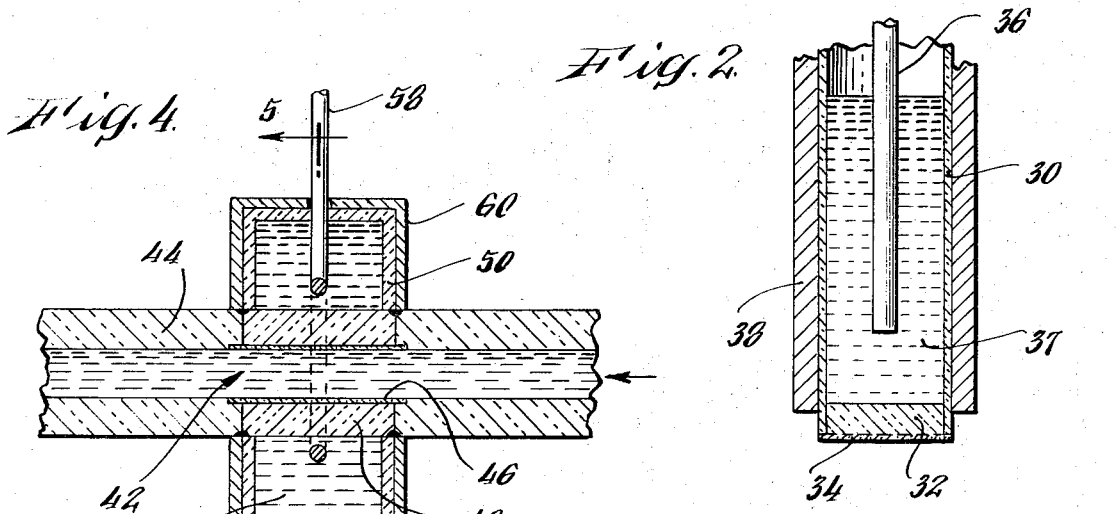
Fig. 4.　　Fig. 2.
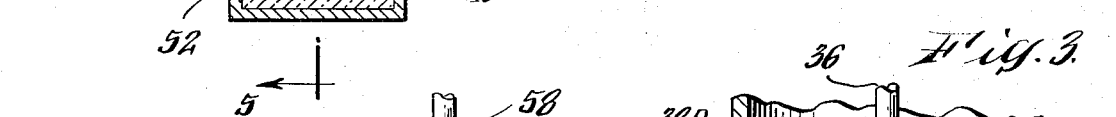
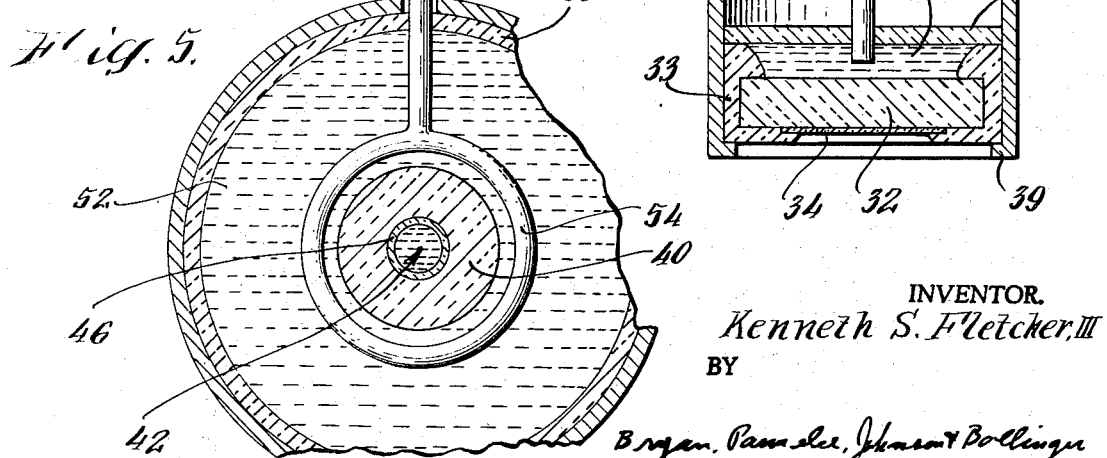
Fig. 5.　　Fig. 3.
INVENTOR.
Kenneth S. Fletcher, III
BY
Bryan, Parmelee, Johnson & Bollinger
ATTORNEYS.

ION-RESPONSIVE ELECTRODE CONSTRUCTION

This is a continuation of application Ser. No. 64,952 filed Aug. 19, 1970.

This invention relates to ion-sensitive electrodes for measuring ionic activity or concentration. More particularly, this invention relates to an electrode construction having substantial mechanical strength and ruggedness to facilitate use directly in industrial processes.

Measurements of ionic activity (or concentration) have long been made by inserting into the test liquid a pair of electrodes at least one of which may be provided with a fragile membrane selectively responsive to the particular ion of interest. One common type of such measurement is that of hydrogen ion activity (pH), conventionally made by a pair of electrodes referred to respectively as a glass electrode and a reference electrode. Such electrodes develop an e.m.f. (potential) which is a function of hydrogen ion activity. This potential is directed to an amplifier the output of which may drive an indicating or controlling device.

A glass electrode generally comprises a cylindrical tubular element of glass closed off at one end by a thin bulbous glass membrane formed of a special composition sensitive to hydrogen (or other) ions. The outer surface of this membrane is immersed in the test liquid, to make electrical contact therewith. Within the tubular element is an electrically-conductive buffer liquid (electrolyte) which wets the inner surface of the glass membrane to establish electrical continuity with properly controlled differential potentials.

Immersed in the electrolyte is a circuit-completing internal element formed for example of silver, silver chloride and connected to an output lead extending to one input terminal of an amplifier. The other amplifier input terminal is connected to the reference electrode. These two electrodes form, together with the test liquid, an electro-chemical cell which generates an e.m.f. proportional to hydrogen ion activity. The individual glass or reference electrodes thus are at times referred to as "half cells." Detailed information on such known arrangements may be found in the book "Determination of pH, Theory and Practice," by Roger G. Bates (John Wiley and Sons, New York, 1964); see particularly Chapter 11.

The accuracy of measurement with a glass electrode system is dependent in part upon its overall effective internal resistance, primarily the resistance of the membrane. As in any voltage generating arrangement, the higher the internal resistance, the greater will be the difference between the voltage measured at the output terminals and the actual internally generated voltage, because of the voltage drop across the internal resistance resulting from the flow of current to the voltage measuring device. (Although there would be no internal voltage drop if the measuring device did not draw any current, as a practical matter the measurement requires some current flow, even though very tiny when measuring devices with extremely high input impedance are used.)

Accordingly, the effective internal resistance of a glass electrode should be made as low as possible. Since glass has a very high bulk resistivity, the glass membrane must be quite thin, in order to assure a sufficiently low internal resistance for accurate measurements. Even with such thin membranes, the internal resistance typically is so high that quite sophisticated electronic techniques are required to make reasonably accurate measurements of the potential developed.

Although conventional glass electrodes have been used successfully for many years in making laboratory measurements and the like, there have been problems in employing such electrodes widely in industrial process instrumentation applications. One important reason for this is that the glass electrode membrane, because it is so thin, is relatively delicate and thus cannot withstand the kinds of mechanical shock and other abuse which instruments typically receive in an industrial process environment. It is not possible simply to make the glass membrane more rugged merely by increasing its thickness, for a thick membrane would present too high an electrical resistance for accurate measurement of the electric potentials developed. Various attempts have been made to solve this problem by providing special protective means for the electrode, and by developing a ruggedized electrode, but none of the solutions has been entirely satisfactory.

Accordingly, a principal object of this invention is to provide an ion-sensitive electrode construction which is mechanically rugged. A more specific object of the invention is to provide a ruggedized glass electrode suited for industrial process applications. Still another object of the invention is to provide a reliable and durable electrode construction permitting the use of relatively thin membranes.

Other objects, aspects and advantages of the invention will in part be pointed out in, and in part apparent from, the following description considered together with the accompanying drawings, in which:

FIG. 1 is an elevation view, partly in section, showing a glass electrode embodying the present invention;

FIG. 2 is an enlarged detail section taken along line 2—2 of FIG. 1;

FIG. 3 is a detail section showing a modified form of construction;

FIG. 4 is a vertical section showing an alternate arrangement embodying the present invention; and FIG. 5 is a cross-section taken along line 5—5 of FIG. 4.

Referring now to FIG. 1, there is shown a glass electrode 10 inserted in a pipe 11 to contact a stream of flowing liquid 12 the hydrogen ion activity of which is to be measured. The electrode may in practice be mounted in a flange of the pipe, but such details have been omitted for the sake of simplicity. The output terminal 14 of the electrode is connected in the usual fashion through a cable 16 to one input terminal 18 of an amplifier 20. The other input terminal 22 of this amplifier is connected by a lead 24 to a conventional reference electrode such as a silver, silver chloride cell 25 inserted into the flowing liquid 12 at a point spaced from the electrode 10. The output of the amplifier drives an indicator or the like, illustrated at 26.

Referring now also to FIG. 2, the glass electrode 10 comprises an elongate cylindrical glass tube 30, similar generally to the glass tubes used in conventional electrodes. The lower end of this tube is sealed off by a relatively thick and mechanically strong mass of porous inert material 32, not sensitive to the ion of interest (hydrogen, in this case). In the preferred embodiment, this mass of material is in the form of a support disc made of porous ceramic material dimensioned to fit closely within the end of the tube. This ceramic disc is fused to the glass tube, using known technology, to produce a sealed mechanical joint of substantial strength. For example, the ceramic-and-tube assembly can be heated by a flame to fusing temperature to cause the glass material to flow a small distance into the channels of the porous ceramic material, to effect a tight locking engagement therewith.

The outer (lower) surface of the porous disc 32 carries an extremely thin (e.g., 0.005 inches) layer 34 of ion-sensitive glass, adapted to serve as a membrane sensitive to hydrogen (or other) ions. This glass layer is supported structurally by the disc 32; that is, the ceramic (or other selected porous material) acts as a mechanically rugged substrate or matrix supporting the thin glass layer. Thus the tendency of the membrane to shatter or be damaged by physical abuse, or thermal shock, is substantially reduced relative to a conventional glass electrode construction.

Inserted through the top of the glass tube 30 is the usual conductive metal probe 36 (for example, a silver, silver-chloride reference element) connected to terminal 14. The probe is immersed in a liquid electrolyte solution 37, e.g., a buffered solution of fixed hydrogen ion concentration and saturated with AgCl in the case of a pH electrode, or a solution of NaCl saturated with AgCl in the case of a sodium ion sensitive glass electrode.

The tube 30 and the membrane-coated ceramic disc 32 together serve as walls defining a container (or vessel) holding the electrolyte liquid 37 in continuous contact with the ceramic material. This ceramic material is permeable so as to provide effectively continuous (or interconnected) internal channels therethrough. The liquid electrolyte thus flows (or seeps) down through these channels of the porous material to make contact with the inner surfaces of the thin glass membrane 34. The other side of this membrane is in contact with the flowing liquid 12, and accordingly the membrane develops in the usual fashion a potential between its surfaces responsive to the concentration of hydrogen ions in the liquid 12.

The materials of the disc 32 and the thin membrane of glass 34 secured thereto are so selected as to have substantially identical coefficients of thermal expansion, e.g., within 1 or 2 percent. This helps to insure that there will be no fracturing of the thin membrane 34 in the event of a relatively wide change in ambient temperature, such as might be experienced in typical industrial process applications. The coefficient of thermal expansion of the glass tube 30 also should be the same as that of the ceramic material and the glass membrane, to insure maintenance of a good mechanical joint and seal in the face of changes in ambient temperature. The tube 30 and membrane 34 may for some applications be made of identical material.

The ceramic-glass elements of the electrode 10 may in accordance with one procedure be assembled by first fusing the ceramic disc 32 to the glass tube 30, and then applying the ion-sensitive glass membrane 34 over the ceramic disc and the exposed end surfaces of the tube. The fusion of the ceramic to the cylindrical tube can be accomplished by the localized heat of a torch, by induction heating, by micro-waves, or preferably by an infra-red heater having a parabolic reflector arranged to produce a small intensely heated region.

For example, with one commercially available infra-red heater the heated region may be in the form of a circle having a diameter of about one-half inch, and adapted to develop a temperature of about 1,000°C. With the ceramic disc 32 snugly in position in the end of the glass tube, application of such heat to a central portion of the ceramic will cause sufficient heat to flow outwardly to the glass tube to soften the glass. The ceramic has a much higher melting point than the glass, so that the ceramic does not melt, and thus retains its porosity. The softened glass will tend to be drawn into the fine internal passages in the side walls of the ceramic disc to effect an intimate and tightly-locked fusion upon subsequent cooling. After allowing the heated parts to cool, the exposed flat end surface of disc 32 and the immediately adjacent end edges of the glass tube 30 may be ground smooth to planar form in preparation for application of the thin glass membrane layer 34.

This glass membrane 34 may be applied to the ceramic disc 32 in any of several ways. For example, the ion-sensitive glass may first be ground into a powdered form and mixed with an organic binder to form a liquid slurry. This slurry then is spread onto the flat surface of the ceramic disc to form a coating covering the entire surface of the disc and the end surfaces of the glass tube as well. This coated disc then is heated locally to a temperature above the softening point of the glass (but below the softening point of the ceramic), as by means of the infra-red heater referred to above, or other heating means, and thereafter allowed to cool to develop a glazed surface on the disc.

In one pH electrode constructed in accordance with the present invention, using the slurry coating process described above, the glass was a high sodium error type composed of 6 percent by weight of CaO, 22 percent by weight of $Na_2O$, and 72 percent by weight of $SiO_2$. This glass is available under the code name CO150 from the Corning Glass Works; Corning, New York. (Reference also may be had to the above-mentioned book by Roger Bates, pages 325–329.) The glass first was ground into a fine powder and then mixed with an organic binder consisting of nitrocelluloseamylacetate. The resulting mixture was painted onto the porous substrate, formed in this case of magnesium silicate, and the organic binder was volatilized at 100°C. The coating then was glazed by heating the glass and substrate at 950°C in a muffle furnace. The glazed pellet was then mounted into a glass tube of the same glass composition, using a torch.

For some applications, the ion-sensitive glass 34 may advantageously be applied to the ceramic disc 32 (after the latter has been fused to the glass tube 30) in the form of a thin, rigid pre-formed disc or wafer, rather than a wet slurry coat. This pre-formed disc is assembled with the ceramic disc so that the two discs are aligned face-to-face, and the interface of the disc assembly then is heated to the working point temperature of the ion-sensitive glass by localized heat as discussed previously. At this working point the glass melts, at least to a semi-liquid state, and flows to some extent into the porous channels of the ceramic disc.

The temperature is kept below the melting point of the ceramic material. The molten glass tends to form puddles which effectively "wet" the ceramic, and the porous channels of the ceramic serve to "wick" the molten glass a short distance into the ceramic to aid in creating the desired tightly-locked gripping engagement therebetween after cooling. The molten ion-sensitive glass also fuses at the outer edges thereof to the glass tube 30, in a glass-to-glass seal of good strength and durability. The result is an integral, intimately bound composite unit, comprising a porous ceramic substrate having a very thin glazed membrane surface on the outer side thereof, and sealed in a liquid-tight fashion to the glass tube.

Such disc-to-disc forming techniques have been used to fabricate a pH electrode membrane assembly wherein the membrane was a low sodium error glass composed of 10.4 percent by weight $Li_2O$, 12 percent by weight BaO, 20.2 percent by weight $La_2O_3$, and 57.4 percent by weight $SiO_2$. This glass material was secured as a thin membrane to a substrate consisting of porous magnesium silicate (specifically material referred to as Alsimag 222, produced by The American Lava Corporation of Chattanooga, Tennessee). This glazed disc was sealed into a tube 30 of Owens-Illinois glass KG–1.

The electrode may for some applications be assembled by first applying the ion-sensitive glass to the porous ceramic disc 32 as a membrane 34 covering one face of the disc, and then fusing this integral composite unit to the end of the glass tube 30. For example, the ion-sensitive glass may be applied as a slurry, or as a pre-formed thin rigid disc-like plate, as described above, using either localized heat, or the heat of an oven. Thereafter, the integral ceramic/glass-membrane unit can be fused into place at the end of a glass tube, as by known localized heating techniques.

The disc-to-disc fusion process also was used to construct an electrode component with a sodium ion-sensitive glass comprising 10.1 percent by weight of $Na_2O$, 27 percent by weight of $Al_2O_3$, and 62.9 percent by weight $SiO_2$. (See also U.S. Pat. No. 2,829,090.) The pre-formed rigid disc made of this glass had a diameter of 0.93 inches and a thickness of 0.01 inches. This glass disc was fused to the flat surface of a porous alumina disc one inch in diameter by 0.125 inches thick.

The fusing of the two discs was carried out in a furnace the temperature of which was gradually brought up from room temperature to 1,100°C over a period of 2 hours. This elevated temperature was maintained for 15 minutes, and then the furnace was allowed to cool slowly back to room temperature over a period of 8 hours. The resulting integral unit of ceramic-and-glass was then fused in place at the end of a glass tube 30, using localized heating techniques.

In some cases, there may be advantage in fusing the membrane to one flat surface of the ceramic disc while the periphery of the disc is simultaneously being fused to the glass tube, in a one-step procedure, preferably using only localized heating. For certain combinations of materials, the localized heat of an infra-red heater, focussed on the disc, may be adequate to effect both fusion operations at the same time.

The ion-sensitive glass may be applied to the porous substrate by a process within the category known as "plasma deposition." In one such process, referred to as flame spraying, an inert, heated, ionized gas is caused to flow towards the substrate. Powdered glass of the proper composition is fed into the stream of flowing gas, and is carried thereby onto the substrate. The glass particles are heated by the gas so that the glass is flowable when it strikes the substrate, thereby forming a glazed surface which intimately grips the porous surface to make an integral assembly therewith.

The electrode 10 preferably is provided with an outer tube 38 of tough, shock-resistant material. This tube may with advantage be made of a conductive metal. Referring also to FIG. 3, the operative components may all be located at the lower end of a metal tube 38A. This metal tube is provided with an annular, inwardly-extending flange 39, and the ceramic disc 32 is sealed thereto by a glass seal 33. The container for the electrolyte 37 is completed by a glass disc 30A fused with the glass seal 33. The glass seal 33 also is fused to the ceramic material 32 (but only near the edges thereof), to the metal container (including the flange), and also to the thin membrane 34. Thus the electrode is tightly sealed against leakage, and yet provides a rugged and relatively simple construction. All four components (glass seal, glass membrane, ceramic and metal) used in this embodiment should have the same coefficients of thermal expansion.

Referring now to FIGS. 4 and 5, a glass electrode in accordance with the present invention may be constructed in a "flow-through" configuration. In this arrangement, a porous ceramic mass 40 is provided in the form of a relatively thick and rugged tubular element having a central longitudinal passage 42. This element is secured coaxially in a flow pipe section 44 which may be made of glass, although in some applications a metal pipe will be superior. The walls of the central passage 42 through the ceramic disc are coated with a thin glass membrane 46, fused to the ceramic in any suitable fashion, such as described hereinabove.

The interfaces between the side walls of the ceramic element 40 and the pipe 44 are sealed off from the test liquid, e.g., by extending the thin glass layer 46 over the joinder region. At the outer periphery of the disc, it is sealed to a toroidal liquid-tight glass casing 50 containing an electrolyte buffer liquid 52. Immersed in this liquid is a conductive element 54 one part of which is connected, through a seal-out joint in the casing (details not shown), to an output lead 58.

The electrolyte solution in the casing 50 permeates the interior channels of the porous ceramic element 40 and makes contact with the inner surface of the glazed membrane at the passage 42. Thus, the membrane develops an e.m.f. proportional to the concentration of the ion of interest in the liquid flowing through the electrode. An outer metal shield 60 also may be secured in place around the glass casing 50, to provide electrostatic shielding as well as additional structural support. To complete the electrochemical cell, a flow-through or other conventional reference electrode (not shown) may be installed in the flow pipe 44 at a point spaced axially from the glass electrode.

Although preferred embodiments of this invention have been described hereinabove in detail, it is desired to emphasize that such descriptive material is for the purpose of illustrating the invention and therefore should not be treated necessarily as limiting thereof, it being understood that many variations and modifications will be apparent to those skilled in the art.

I claim:

1. In an electrode for use in measuring the activity or concentration of a predetermined ion in a test solution, said electrode being of the type including a container holding an electrolyte solution and having at one wall portion thereof a thin ion-sensitive membrane exposed at its inner surface to said electrolyte and adapted to be exposed at its outer surface to the test solution for the purpose of developing an electrical potential responsive to the activity or concentration of the predetermined ion;

that improvement in the foregoing type of electrode which comprises:

a rigid member of porous inert material serving as part of said wall portion of said container and arranged for exposure at one surface thereof to said electrolyte, said rigid member having a higher melting temperature than said ion-sensitive membrane;

said rigid member carrying on a surface thereof opposite said one surface said thin ion-sensitive membrane in the form of a separate member fused to said rigid member with the ion-sensitive membrane material interengaged with pores of the rigid member to effect a tight-locking seal engagement between said two members;

the porosity of said inert material providing continuous channels through which said electrolyte can travel to contact the material of said membrane in pores at the interface between said two members;

the opposite surface of said membrane being arranged for exposure to said test solution;

said porous material being substantially thicker and mechanically stronger than said membrane.

* * * * *